Figure 1:
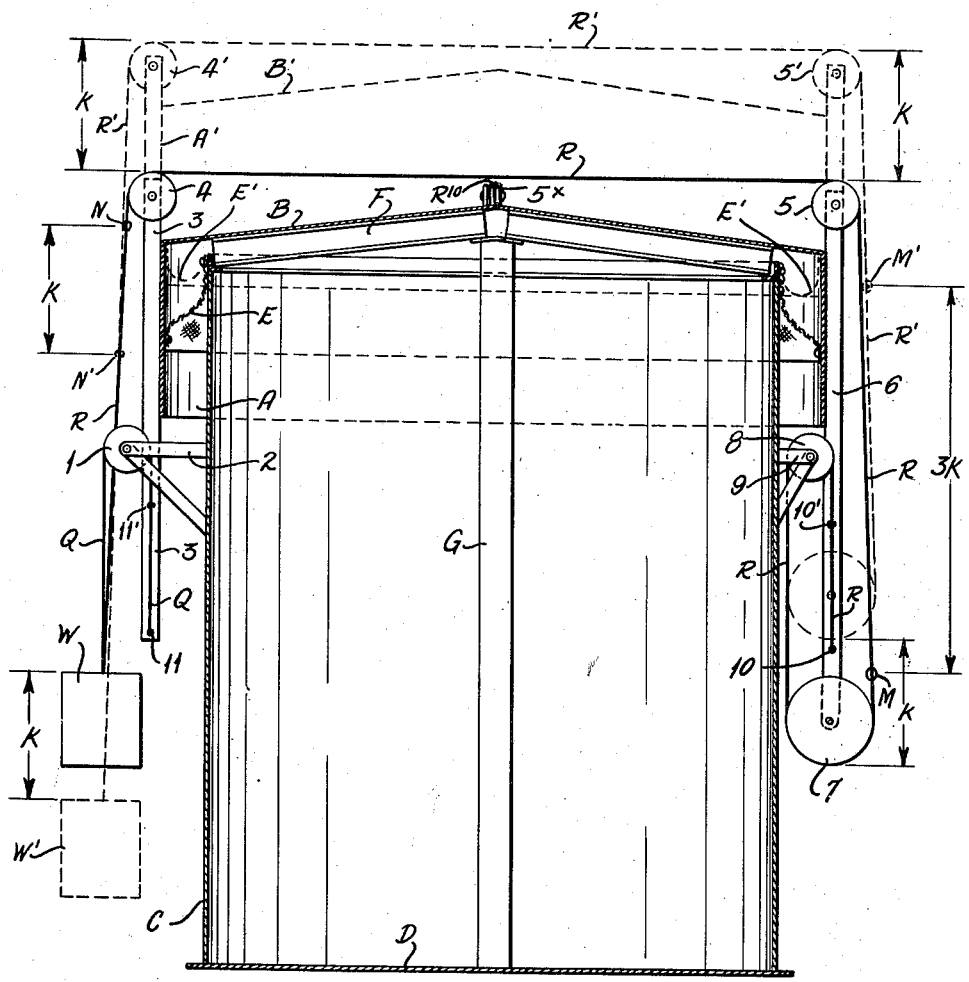

May 29, 1951

J. W. ALLEN 2,554,766

BALANCING MECHANISM

Filed Jan. 6, 1947

2 Sheets-Sheet 1

INVENTOR:
JOHN W. ALLEN

BY Hella R. Church

ATTORNEY.

May 29, 1951 J. W. ALLEN 2,554,766
BALANCING MECHANISM
Filed Jan. 6, 1947 2 Sheets-Sheet 2

INVENTOR:
JOHN W. ALLEN
BY Wells L. Church
ATTORNEY.

Patented May 29, 1951

2,554,766

UNITED STATES PATENT OFFICE 2,554,766

BALANCING MECHANISM

John W. Allen, Chicago, Ill., assignor to John H. Wiggins, Chicago, Ill.

Application January 6, 1947, Serial No. 720,405

3 Claims. (Cl. 48—176)

This invention relates to gas holders and other fluid-storage apparatus of the kind that comprise a tank or equivalent stationary lower portion, a vertically-movable bell or equivalent part that forms the roof of said tank and which is capable of rising and falling so as to vary the internal volume of the fluid storage space of the apparatus, and a balancing, leveling or stabilizing mechanism for maintaining said vertically-movable roof in a level, or substantially level, position during the rise and fall of same, comprising at least a pair of cables or equivalent flexible elements attached to the roof at widely separated points on the peripheral portion of same, pulleys, sheaves, wheels or equivalent devices that support and guide said cables, and a weight combined with said cables in such a way that if the roof tilts, or tends to tilt, in one direction, one of said cables becomes operative to resist or counteract such tilting movement, and if the roof tilts, or tends to tilt, in a different direction, a different cable becomes operative to restrict or counteract such tilting movement of the roof.

The main object of my invention is to improve the operation, reduce the cost, and simplify the construction of a fluid storage apparatus balancing, leveling or stabilizing mechanism of the general type mentioned.

Another object is to provide a balancing, leveling or stabilizing mechanism of the kind above mentioned, which is of such design or construction that it is not necessary to equip the tank or stationary lower part of the apparatus with relatively high towers or uprights for supporting the sheaves, wheels, or equivalent devices over which the cables travel at points between the roof and the weight that co-acts with the cables to resist tilting movement of the roof.

And still another object of my invention is to provide a balancing, leveling, or stabilizing mechanism of the general type mentioned, which, in addition to overcoming the necessity of equipping the tank with relatively high towers or supports for the cable sheaves, also overcomes the necessity of having one or more of the cables positioned on the interior of the tank and arranged in stuffing boxes or the like in the side wall of the tank. Other objects and desirable features of my invention will be hereinafter pointed out.

I have herein illustrated my invention embodied in a balancing, leveling, or stabilizing mechanism, which is of such construction that if the vertically-movable roof or equivalent part of the apparatus moves, or tends to move, out of a level or horizontal position, said roof is brought back to its normal, level position by an upward pull exerted by one of the cables on the low side of the peripheral portion of the roof, but I wish it to be understood that my invention contemplates arranging the cables and weight in such a way that if the roof moves, or tends to move, out of a level or horizontal position, such movement or incipient movement, is counteracted by a downward pull exerted by one of the cables on the high side of the roof, i. e., on that part of the peripheral portion of the roof which has moved, or tended to move, upwardly relatively to the other parts of the peripheral portion of the roof. As herein used, the term "cables" is intended to include chains or any other kind of flexible elements employed to transmit, or assist in transmitting, movement from the weight to the roof, and the term "sheaves" is intended to include pulleys, wheels, and other kinds of devices used to guide the cables and cause the load of the weight to resist movement of the roof tending to throw the roof out of balance, my improved stabilizing, leveling or balancing mechanism being capable of use with any kind of fluid storage apparatus equipped with a vertically-movable bell or equivalent part that rises and falls during the normal use of the apparatus.

The accompanying drawings illustrate my invention applied to a gas holder provided with a "lifter" roof and with a dry seal that maintains a gas-tight joint between the lifter roof and the side wall of the tank which constitutes the lower portion of the gas holder.

Figure 1 of the drawings is a vertical transverse sectional view of a fluid storage apparatus equipped with a balancing mechanism constructed in accordance with my present invention.

Figure 2:
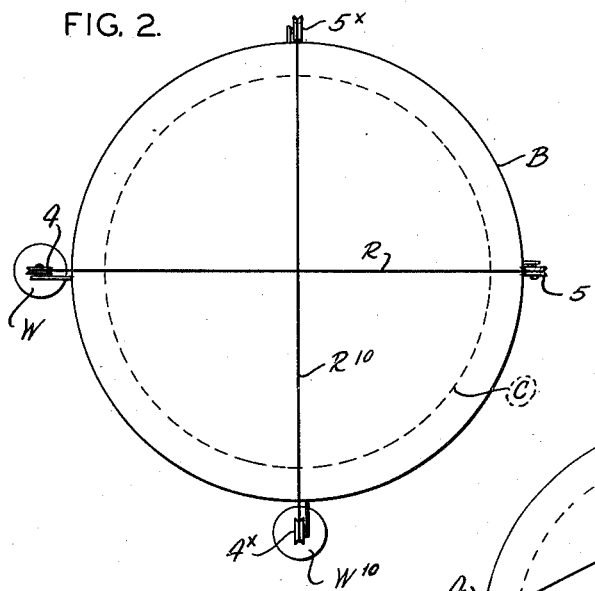
Figure 3:
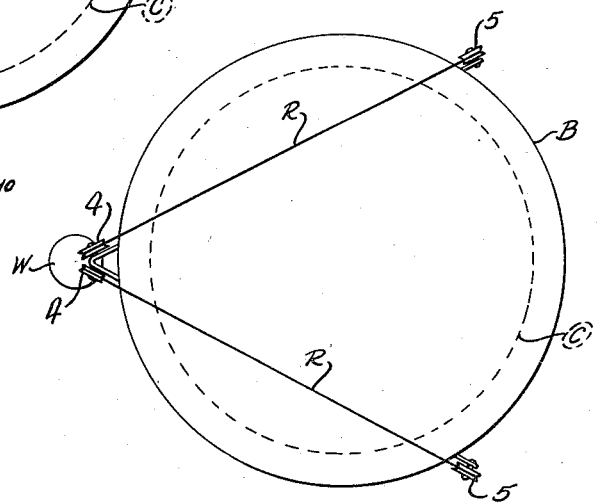

Figure 2 is a top plan view of the structure illustrated in Figure 1 and shows how the vertically-movable roof of the storage space is balanced in four directions by two pairs of cables attached at four different points on the peripheral portion of the roof, separated from each other by angles of 90°, each pair of cables co-operating with a separate weight, and Figure 3 is a top plan view, showing how the roof can be balanced in three different directions by a weight and three cables attached at three symmetrically-arranged points on the peripheral portion of the roof.

In the drawings, C designates the side wall of the tank or stationary lower portion of a fluid storage apparatus, D designates the bottom of said tank, B designates a "lifter" roof or vertically-movable roof that forms the top wall of the storage space of the apparatus, A designates a depending skirt portion on the roof arranged in telescopic relation with the side wall of the tank, E designates a conventional "dry seal" attached to the tank side wall C and to the skirt portion A of the roof, so as to maintain a gastight joint between said parts and still permit the roof to rise and fall and thus vary the volume of the storage space, and F designates rafters attached to the tank side wall and to a center post G, so as to support the roof when it is in its lowermost position.

My improved balancing, leveling, or stabilizing mechanism comprises a vertically-movable weight W arranged on the exterior of the tank side wall at the left hand side of same (looking at Figure 1), and a pair of cables Q and R attached to said weight and to widely-separated points at the peripheral portion of the roof in such a manner that any forces tending to raise or lower one side of the roof relatively to the other side of the roof, for example, the right hand side relatively to the left hand side, or vice versa, are counteracted by the load of the weight W, applied to the peripheral portion of the roof by one or the other of the cables Q or R. The cable Q, which is attached at its lower end to the weight W, leads upwardly from the weight over a sheave 1 carried by a laterally-projecting bracket 2 on the side wall of the tank, and thence downwardly from said sheave 1 to a point 11 on the peripheral portion of the roof to which the other end of said cable Q is attached. The particular level of the sheave 1 relatively to the top edge of the tank side wall, and the particular level of the cable attaching point 11 relatively to the top portion of the roof is immaterial, so long as the vertical height or distance between said sheave 1 and cable attaching point 11 is approximately equal to the designed rise of the roof. If the sheave 1 is located at a level considerably lower than the top edge of the tank side wall, as in the apparatus herein illustrated, it is necessary that the cable Q be attached to the peripheral portion of the roof at a distance below the sheave 1, equal to the designed rise of the roof, this effect being obtained by providing the skirt A of the roof with a vertically-disposed post 3 that forms a rigid extension at the lower end of the skirt to which the cable Q can be attached at a point 11, which is the required distance below the sheave 1 on the tank side wall. The cable R, which is attached to the weight W at the same point as the cable Q, leads upwardly from said weight over a sheave 4 mounted on the left hand side of the roof B, preferably on the upper end portion of the post 3, thence passes transversely across the top side of the roof to a sheave 5 located at the right hand side of the roof, and mounted preferably on the upper end portion of a vertically-disposed post 6, which is attached to the exterior of the right hand side portion of the skirt A. After passing over the top side of the sheave 5, the cable R extends downwardly to a sheave 7 mounted on the lower end portion of the post 6, thence passes under said sheave 7 and upwardly from same to a sheave 8 carried by a laterally-projecting bracket 9 on the right hand side of the tank side wall, said cable R passing over the sheave 8, thence downwardly from same to an attaching point 10 on the post 6. When the internal pressure of the storage space of the apparatus increases, the roof B and the co-acting parts of the stabilizing mechanism assume the positions indicated by broken lines and by prime marks on the previously mentioned reference characters, as shown in Figure 1. During such movement of the roof, the cable R moves bodily upwardly with the roof, due to the facts:

(1) That the horizontal run of said cable which extends transversely across the top side of the roof is supported by sheaves 4 and 5 that are mounted on the roof;

(2) That the sheave 7 under which the cable R travels, is also carried by the roof and moves upwardly towards the sheave 8 carried by the tank side wall when the roof rises; and (3) That one end of the cable R is attached to a point on the right hand side of the roof that moves upwardly the same distance and at the same speed as the sheave 7 under which the cable R travels before contacting the sheave 8 mounted on the side wall of the tank.

In a stabilizing or balancing mechanism of the construction above described, the cables Q and R exert an upward pull on the skirt portion of the roof, at opposite ends of a diameter of the roof. In order that the upward lift will be equal on the two points 10 and 11, at which said cables are attached to the peripheral portion of the roof, the net uplift on posts 3 and 6 must be the same, and therefore, equal W/2. It is seen that the cable R pulls up once at 10 and twice on sheave 7, and down once at sheave 5. This leaves a net upward lift on post 6, which is equal to twice the tension in cable R. The cable Q pulls upwardly on post 3 a certain amount, and cable R pulls downwardly on post 3 an amount that is equal to the tension in R. If the tension in R equals ¼ W, and the tension in Q equals ¾ W, then the necessary result is obtained, i. e., that the net uplift on post 3 and post 6 are both equal to ½ W. At the right hand side of the roof we have a net upward lift by cable R equal to ½ W (determined by three uplifts and one down pull); and on the left hand side of the roof we have a resultant uplift on post 3 equal to ½ W (determined by ¾ W tension in Q, minus ¼ W down pull in R).

Now to analyze the movement of the two cables: It is readily seen that as weight W moves downwardly a distance "K," that the point 11 moves upwardly a distance "K." Take a point M on the cable R. As the skirt A moves upwardly a distance "K," then the point M on cable R moves upwardly a distance "3K," because there are three vertical runs of said cable R attached to post 6. The rise of the sheave 5 uses up one of these "3K." The rise of sheave 4 uses up another one of these "3K." This leaves a single distance "K" to be accounted for on the opposite end of the cable R. Therefore, the point N on the vertical run of the cable R at the left hand side of the roof moves downwardly relatively to the ground, or to the tank itself a distance "K." Therefore, the entire roof has moved upwardly a distance "K," the weight W has moved downwardly a distance "K," and both ends of the diameter of the roof have moved upwardly an equal distance "K." The net uplift on the roof is then equal to the load of the weight W, ½ of it being applied at 11, and the other half being applied at 10. Consequently, the weight W not only balances the roof against external loads, but said weight W also acts as a counterweight to lift the roof, which is very desirable, in order to reduce the operating pressure of the roof as it rises and falls.

Preferably, an additional pair of cables, a weight and co-acting guiding and supporting sheaves are used in conjunction with the weight W and cables Q and R, shown in Figure 1, to balance the roof in all directions, said additional pair of cables being arranged at right angles to the cables Q and R, shown in Figure 1. In Figure 2 the reference character W10 designates the weight that co-acts with said additional pair of cables, the reference character R10 designates the cable that extends transversely across the top or the roof, the reference character 4X designates the sheave on the roof in vertical alignment with the weight W10, and the reference character 5X designates the sheave at the opposite side of the roof.

Instead of using two systems placed at right angles to each other, three or more systems may be used at substantially equal spaces around the tank. Figure 3 illustrates a mechanism comprising a single weight W connected to the left hand side of the roof by a single cable corresponding to the cable A, shown in Figure 1 and connected by two cables R with symmetrically-spaced points on the peripheral portion of the roof, each of said cables R comprising a horizontal run that travels over sheaves 4 and 5 on the roof, and a plurality of vertical runs arranged as shown at the right hand side of Figure 1.

Instead of attaching the right hand end of the cable R to the lower end portion of the post 6 on the right hand side of the skirt of the roof and keeping said cable taut by means of a sheave 8 carried by a stationary bracket on the tank side wall and two spaced sheaves 5 and 7 that travel vertically with the roof and which are arranged above and below the stationarily mounted sheave 8, I can obtain the same result by a system of levers of the construction and arrangement shown in my divisional application Serial No. 28,719, filed May 22, 1948, now Patent No. 2,540,773.

Having thus described my invention, what I claim as new and desire to secure by Letters Patent is:

1. A balancing mechanism for a vertically-movable roof provided with a depending skirt arranged in telescoped relationship with the side wall of a stationary tank, comprising a vertically-movable weight arranged at one side of the tank, a cable leading from said weight over a guide on the tank side wall and attached to a downwardly-projecting extension on the skirt at a point lower than the guide on the tank side wall, and a second cable leading upwardly from said weight, thence horizontally across the top side of the roof, thence downwardly and around a sheave mounted on a second downwardly-projecting extension on the roof skirt, thence upwardly and over a sheave carried by the tank side wall, and thence downwardly to a point of attachment on the said second downwardly-projecting extension on the roof skirt.

2. A balancing mechanism for a vertically-movable roof provided with a depending skirt arranged in telescoped relationship with the side wall of a stationary tank, comprising a vertically-movable weight arranged at one side of the tank, a cable leading from said weight over a guide on the tank side wall and attached to a downwardly-projecting extension on the skirt at a point lower than the guide on the tank side wall, a second cable leading upwardly from said weight over the top side of the roof, and thence downwardly to an attaching point on a second downwardly-projecting extension on the roof skirt, a guide sheave for said second cable mounted on the said second downwardly-projecting extension at a point below the point of attachment of said second cable to said second downwardly-projecting extension, and a second guide sheave for said second cable mounted on the tank side wall at a point above the point of attachment of the second cable to the said second downwardly-projecting extension on the roof skirt.

3. A fluid storage apparatus, comprising a tank, a vertically-movable roof for said tank provided with a depending portion arranged in telescoped relation with the side wall of the tank, a vertically-movable weight at one side of the tank, a pair of cables leading from said weight and attached to the roof at widely-separated points for normally maintaining said roof in a level position, one of said cables comprising a horizontal run that is supported by and extends over the top side of the roof and a plurality of vertical runs located at the side of the apparatus in remote relationship with said weight, and coacting sheaves carried by the roof and by the side wall of the tank and combined with the plurality of vertical runs of said last mentioned cable, for holding said cable in a taut condition.

JOHN W. ALLEN.

REFERENCES CITED

The following references are of record in the file of this patent:

UNITED STATES PATENTS

| Number | Name | Date |
| --- | --- | --- |
| 2,366,821 | Wiggins | Jan. 9, 1945 |
| 2,436,348 | Allen | Feb. 7, 1948 |